Aug. 25, 1931. B. W. FREEMAN Re. 18,162

POWER DRIVE FOR SLIDES

Original Filed Sept. 15, 1924 3 Sheets-Sheet 1

Inventor

B. W. FREEMAN.

By Riordon & Riordon

Attorney

Aug. 25, 1931. B. W. FREEMAN Re. 18,162

POWER DRIVE FOR SLIDES

Original Filed Sept. 15, 1924 3 Sheets-Sheet 2

Inventor

B. W. FREEMAN.

By Riordon & Riordon

Attorney

Aug. 25, 1931.

B. W. FREEMAN

Re. 18,162

POWER DRIVE FOR SLIDES

Original Filed Sept. 15, 1924 3 Sheets-Sheet 3

Inventor

B. W. FREEMAN.

By Riordan & Riordan

Attorney

Reissued Aug. 25, 1931 Re. 18,162

UNITED STATES PATENT OFFICE

BENJAMIN W. FREEMAN, OF CINCINNATI, OHIO

POWER DRIVE FOR SLIDES

Original No. 1,716,954, dated June 11, 1929, Serial No. 737,770, filed September 15, 1924. Application for reissue filed August 15, 1929. Serial No. 385,985.

My present invention relates to cutout presses, and more particularly to an improved power drive for moving the die or work support into and out of work cutting position.

In presses, and particularly in cutout presses employed in cutting out patterns and shoe uppers, the die or supporting means are moved into and out of cutting position once for each operation. This is necessary in order that the upper operated on may be removed from the work support and a new upper on which the operation is to be performed may be inserted in position on such support.

The dies or work supports are relatively heavy and the movement of such requires a great deal of strength on the part of the operator, and as the operation must be performed many hundreds of times during the working day, the work is extremely fatiguing.

It has been found that, in order to keep up the production, it is necessary to relieve the operators at relatively short intervals, as the falling off in production is particularly noticeable when the operator becomes tired.

With a view to obviating the necessity for so much manual labor in connection with this class of work, I have devised the subject matter of the present invention, which consists essentially in a new and improved form of power drive for dies, and their supporting structures, which may be operated to mechanically move the die or the supporting structure into working position in alignment with the cutting action of a press or out of alignment and into such position as will bring the die or the work support into position where the operator may perform the necessary operations thereon, or in connection therewith. The use of a power drive improves the quality of the work done, particularly as to accuracy in cutting and gauging.

Further the interest of the operators in their work is kept up, because they are not constantly thinking of the work involved in moving the die or carrier into and out of cutting position. Relieved of this worry, it is found that they remain alert and pay attention to their work for a longer time than heretofore.

In practicing the invention I provide a pair of constantly rotating pulleys, each of the pulleys operating in the reverse direction with respect to the other and associated with such pulleys are clutch members, additional to the plunger actuating and machine controlling clutch member, and which may be brought laterally into engaging position to rotate a shaft having means for moving the member attached to the die supporting structure.

An additional feature in the machine of my present invention, and as shown in the accompanying drawings, consists in the provision of safety devices. I have provided mechanism, automatically actuated, which will prevent the starting of the machine until the work is in exact position to be cut. This automatic safety device comprises a dog or plunger which is moved as the cutting die reaches its final position, thereby to operate through mechanical levers or the like, to release means normally preventing the starting of the machine. Thus the operator cannot actuate the foot treadle controlling the machine and start the clutch and the machine until the die is accurately positioned, thereby preventing danger to the operator or damage from the die, or of striking other parts or the work to cause breakage or damage.

In short, the clutch locking means are released when the work is in work cutting position and until it reaches this cutting position the clutch mechanism is locked so that the machine cannot be operated, thus preventing injury to the operator as well as damage thru the movement of the die which might cause damage to the parts, to the work, etc. if the cutting out operation were allowed to take place before the work or the die is in cutting position.

For a more complete disclosure of the machine to which this invention is adapted, reference may be made to my prior Patent No. 1,681,033, granted August 14th, 1928, and over which the present invention represents an improvement.

In the machine disclosed in the patent it will be noted that a reciprocable plunger is actuated through a clutch connection to a power driving shaft for movement toward and from the work support.

Among the objects of the present invention, therefore, are the provision of an improved power drive for mechanically moving a die into and out of alignment or cutting position with respect to a power press, and the combination of such a power driven die with a machine of the type fully described in said prior patent.

In the accompanying drawings:—

Figure 1:
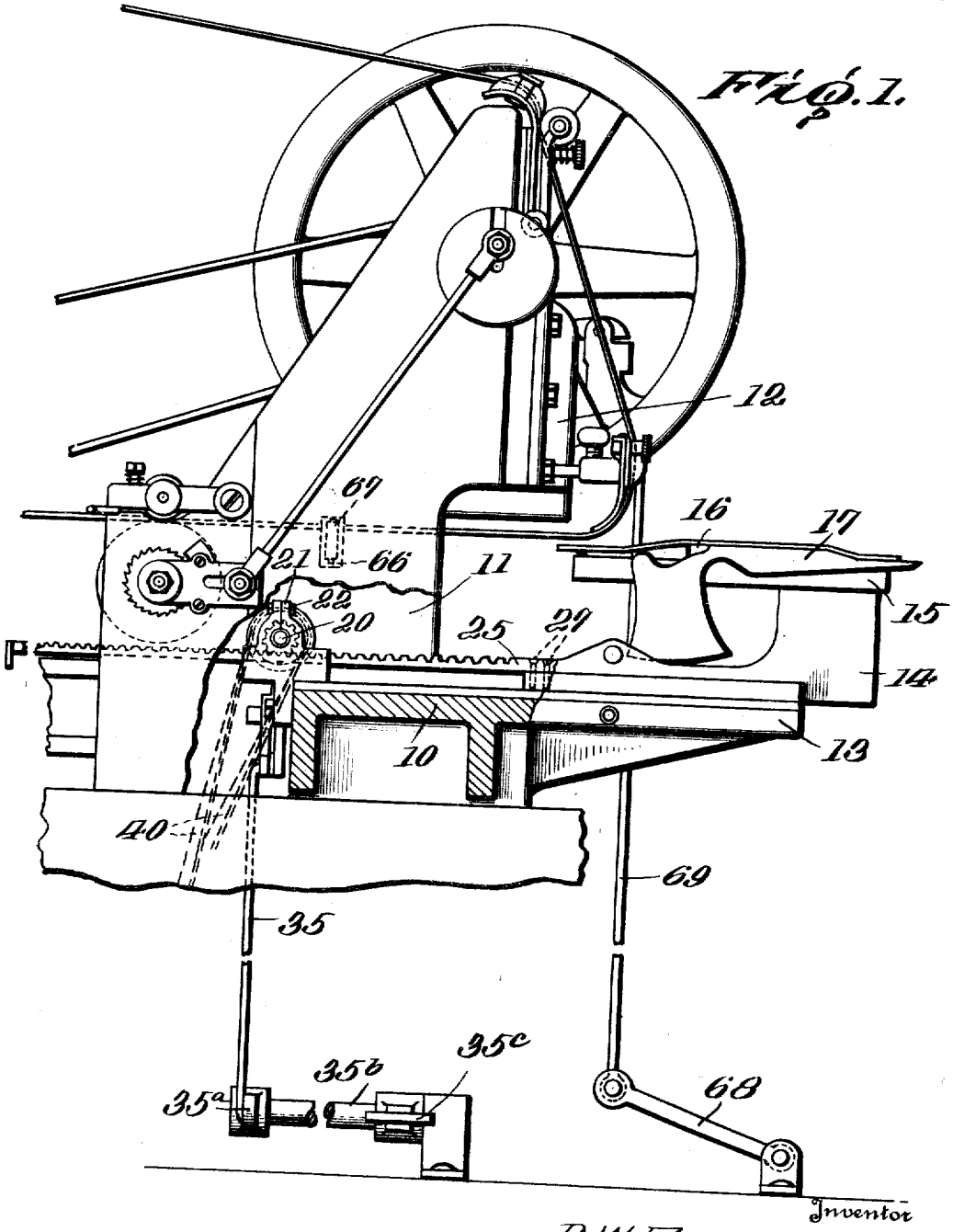
Fig. 1 illustrates a portion of a power press to which my invention has been applied only so much of the power press being shown as is necessary for a clear understanding of the invention.

Referring to the drawings, 10 designates a base on which is mounted the frame work 11. In the frame work 11 is mounted for vertical reciprocating movement a plunger 12. The base extends forwardly or to the right as viewed in Fig. 1, such forwardly extending portion being designated by the numeral 13, and being provided with guideways in which is slidably mounted an anvil slide 14 to the upper end of which is adjustably secured in any desired manner an anvil 15 to the top surface of which is secured a die structure 16 of any desired shape or form.

There is shown associated with the die structure 16 and die anvil 15 a shoe upper 17 in position to be operated on so as to have cut therefrom the pattern fashioned in the die structure 16. It will be noted that the anvil is so constructed as to protect all parts of the upper that are not being cut, as more fully disclosed in my patent above mentioned. Ordinarily the anvil slide 14, die anvil 15 and die 16 are moved as a unit by the operator, who after placing the upper 17 in position on the die structure 16 while the elements referred to are in the position shown in Fig. 1 on the forwardly extending portion of the base 10, moves the same rearwardly of the frame member 11, or to the left, as viewed in Fig. 1, so as to position the die structure under the plunger 12 of the press.

As stated above the weight of the elements 14, 15 and 16 is relatively great and as such elements must be sturdily constructed to stand up under the work, considerable energy is therefore, required to move the members 14, 15 and 16 rearward and forward in the guideways formed in the base 10 and forwardly extending portion 13 thereof.

To obviate the necessity of this manual labor, I have secured to the rear portion of the base 10, and at each side thereof, by bolts 18, bearing brackets 19 and in these bearing brackets 19 are formed split bearings 20, such split bearings being adjustable by means of the bolts and nuts 21 and 22.

Rotatably mounted in the bearings 20 is the shaft 23 having secured to or formed integral therewith, adjacent one end, a pinion 24 which meshes with and drives a rack bar 25 slidably mounted in a guide way 26 formed on the base 10. The forward end of the rack bar 25 is secured to the rearward end of the anvil slide 14 by rivets 27, or in any other suitable or desirable manner.

On the shaft 23 is a member 28 which member is capable of sliding movement longitudinally of the shaft, but is rotatable with said shaft. This member 28 is provided with an annular groove 29 in the lower part of which is closely mounted a clutch pin 30 secured to the top of a member 31 that is pivotally mounted on a stud 32 screwed into a plate 33 extending between the bearing members 19. Formed integral with and extending laterally outward from each side of the pivot point of the member 31 are arms 34 of any desired length and pivotally mounted to the ends of such arms are operating rods 35 which extend downwardly to suitable treadles 35*c* adapted to be controlled by the operator.

Formed on each face of the member 28 are circular recesses in which are secured annular plates 36 of fiber, cork or other suitable material, which are adapted to engage with the inner faces of V-grooved pulleys 37 rotatably mounted on the shaft 23 on either side of the member 28. The V-grooved pulleys 37 are provided on their inner faces with hubs 38 which extend into circular recesses in the member 28. Over the pulleys 37 run belts 40, one of the belts running in such a direction as to rotate its associated pulley in a clockwise direction as viewed in Fig. 1, and the other belt moving in such a direction over its associated pulley 37 as to rotate such pulley in an anti-clockwise direction, as viewed in Fig. 1.

Figure 2:
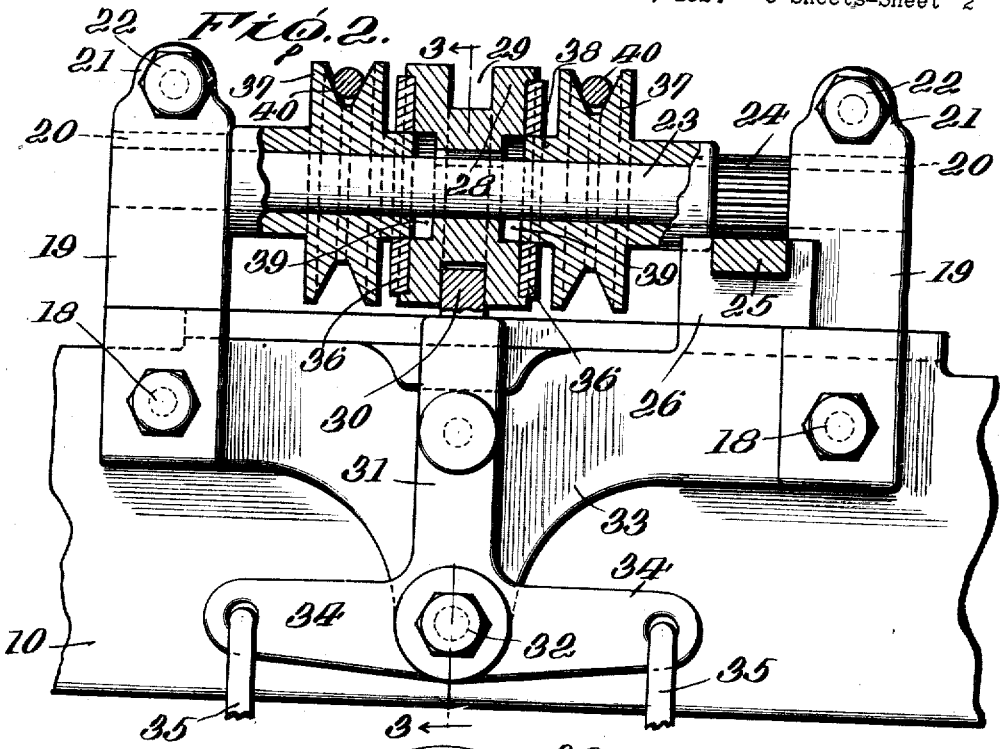
Fig. 2 is a rear elevation of my device.

It will thus be seen that if the elements above described are in the position shown in Fig. 2, the shaft 23 and the member 28 will remain stationary and one of the pulleys, as the right hand pulley 37, rotates in a clockwise direction while the other pulley 37 rotates in an anti-clockwise direction.

If now, the right hand rod 35 as viewed in Fig. 2 is pulled downwardly the upper end of the arm 31 carrying the pin 30 engaged in the groove 29 of the member 28 will be moved to the right, sliding the member 28 along the shaft 23 and bringing the circular member 36 of fiber, cork or other suitable material into engagement with the adjacent face of the right hand pulley 37. The power transmitted to the V-grooved pulley 37 by the belt 40 will be transmitted to the member and therefore to the shaft 23, which as in the case assumed, will rotate in a clockwise direction, thus rotating the pinion 24, which, meshing with the rack bar 25 will move the rack bar to the rear of the press or to the left as shown in Figs. 1 and 3, thus bringing the members 14, 15 and die 16 to the rear of the press and into position in the line of movement of the plunger 12 of such press.

When the members 14, 15 and die 16 have reached their rearwardmost position, the operator will release the treadle to allow upward movement of the rod 35, which it will do because of the balancing of the treadle member in order to prevent the arm 37 from swinging into the reverse position, I have arranged intermediate such arm an enlargement 41 drilled, as indicated at 42, to receive a coil spring 43, and slidably mounted in the drilled portion 42 exterior of the spring 43 is a pointed plunger 44 which engages in the V-shaped depression 45 formed in the plate 33 that extends between the bearing members 19. The pull on the rod 35 is sufficient to cause the pointed end of the member 44 to ride out of the V-shaped depression 45, but the spring 43 is of sufficient tension to maintain the plunger 44 in engagement with the V-shaped depression 45 under ordinary conditions.

Figure 3:
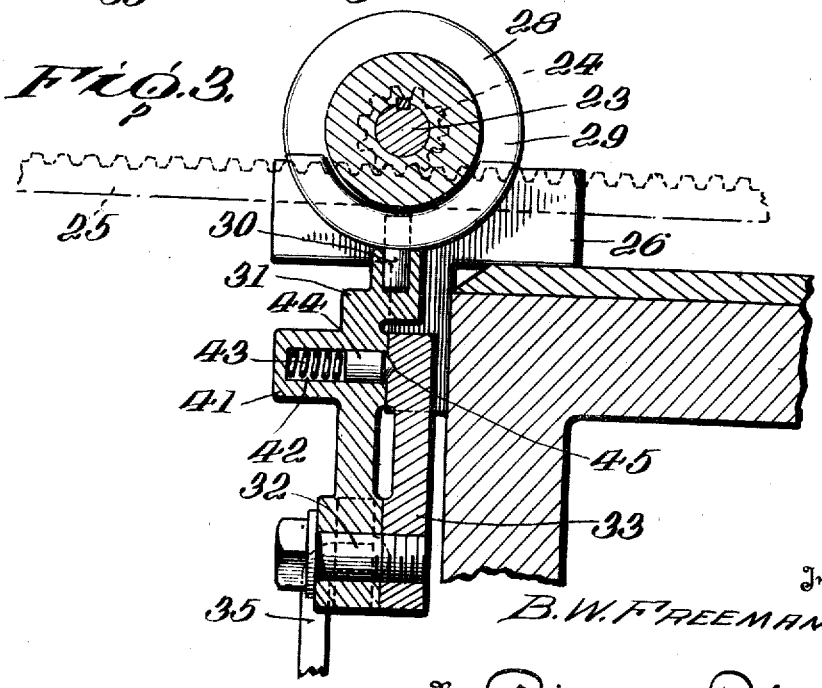
Fig. 3 is a vertical side elevation on the line 3—3 of Fig. 2.

After the operation has been performed on the upper 17, the operator, by operating the treadle mechanism, pulls down on the left hand rod 35, as viewed in Fig. 2, swinging the upper end of the arm 31 to the left, as viewed in Fig. 2, throwing the left-hand circular plate 36 of fiber, cork or other suitable material into engagement with the adjacent face of the V-grooved pulley 37, thereby causing a rotary movement of the shaft 23 in an anti-clockwise direction, which by means of the pinion 24 engaging with the rack bar 25, causes a right hand movement of such rack bar as viewed in Figs. 1 and 3, thus forcing the members 14, 15 and 16 to the right, as viewed in such figures.

As disclosed in my prior patent above mentioned, the plunger 12 is actuated by a clutch which connects the plunger to the power driving shaft 53 and this clutch is brought into operation upon actuation by the operator of a foot treadle.

Figure 4:
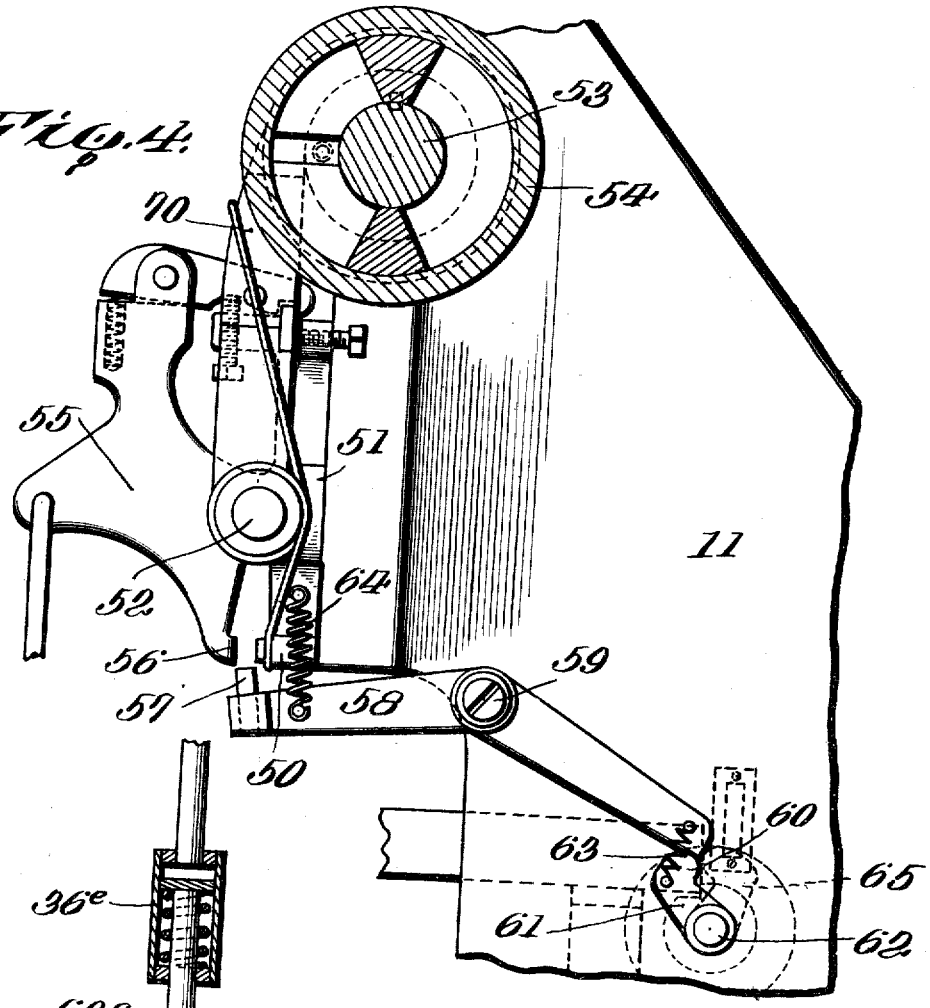
Fig. 4 is a vertical sectional elevation of the automatic safety device.

This clutch is designated generally by the numeral 54 in Fig. 4, and is a one-revolution clutch by means of which the plunger 12 is permitted to make but one reciprocation when the treadle is depressed. Reference may be had to my prior patent for a more complete description of the details of the clutch.

As a safety means for use in connection with the one-revolution clutch I have provided a member 55 rotatably mounted on a shaft 52 secured on a member 51 attached to the body 11. This member has a downwardly and forwardly extending member 56, which lies directly opposite but spaced apart from a projection 50 formed on the member 51. Normally lying between the members 56 and 55 and filling the space therebetween is a plate 57 which is secured to and extends upwardly from the end of one arm of a bell crank lever 58, which bell crank lever is rotatably mounted on a shaft 59 secured to the body member 11 as clearly shown in Fig. 4. The other end of the arm of the bell crank lever is engaged by a cam surface 60 formed on an arm 61 secured to a shaft 62 rotatably mounted in the body member 11. A spring 63 secures one end to the arm 61, and the other end to the arm of the bell crank lever 58, holding the cam surface 60 and the end of the arm of the bell crank lever 58 in engagement with each other. Secured to the body member 11 is one end of a coil spring 64, the other end of which is secured to the bell crank lever 58 adjacent the plate 57, and which spring 64 tends to rotate the bell crank lever 58 in a clockwise direction, as viewed in Fig. 4, and forcing the plate 57 upward and into position between the members 56 and 50.

Secured to the shaft 62 intermediate the ends thereof is an arm 65 which arm lies above the base portion 13. As stated above the anvil slide 14 is arranged for sliding movement in guideways on top of the portion 13. As clearly shown in Fig. 1, the protecting spaces or clearance at each side of the anvil slide 14, when the same is in operative position under the plunger, provides a substantial working space for the hands of the operator above the portion 13, and the face of the plunger, and at the sides of the work supporting and cutting devices, to facilitate adjusting and holding of the work without danger of injury to the operator's hands.

Secured to the frame of the machine by screws 66 is a stop plate 67 which lies in the path of movement of the cutting anvil, and in such relation thereto that when the cutting anvil engages the stop plate the die on the anvil will be correctly positioned in the line of travel of the plunger 12.

The arm 65 is so positioned on the shaft 62 and with relation to the rear end of the cutting anvil 14—15, that when the anvil 15 is moved to its most rearward position with the base part 14 in engagement with the anvil 15, the rear end of the anvil will engage the arm 65 rotating the shaft 62, and causing the cam surface 60 to engage with the end of one arm of the bell crank lever 58, rotating such bell crank lever in an anti-clockwise direction, as viewed in Fig. 4, and moving the attached plate 57 down from between the members 56 and 50. At this instant the end of the cutting anvil comes into engagement with the stop plate 67. When this point is reached, and only when this point is reached, will it be possible for the operator, by pressing on the treadle 68, to pull the treadle rod 69 downward and move the wedge-shaped member 70 forming a part of the clutch 54 out of position, and permit actuation of the one-revolution clutch.

With this device, therefore, positive safety is assured in that it is impossible to operate the clutch mechanism until the work holding devices are correctly positioned beneath the plunger 12, and also it is impossible for the operator to allow the shaft 53 to continuously rotate.

For a more complete description of the specific safety mechanism, and the specific single-revolution clutch cooperating therewith, reference may be had to my prior patent.

When it is desired to operate the anvil slide in synchronism with the reciprocating movement of the cutout press plunger, it will be obvious that any suitable linkage may be utilized to connect the two in lieu of the use of two separate and independent treadles, each with their connections to the machine, as shown in Fig. 1.

As stated above, and as disclosed in my prior patent above mentioned, the plunger is actuated by a clutch which connects the plunger to the power driving shaft 53, and this clutch is brought into operation upon actuation by the operator of a foot treadle, as for example, the treadle 68 and its linkage 69, as shown in Fig. 1. Consequently, any linkage connecting the operating rods 35, which are connected to a suitable treadle 35*c* with the mechanism for throwing the plunger operating clutch into and out of engagement with the power driving shaft, will be readily adapted to cause a movement of the several clutches in synchronism, and thereby accomplish a synchronized movement between the plunger and the anvil.

Figure 5:
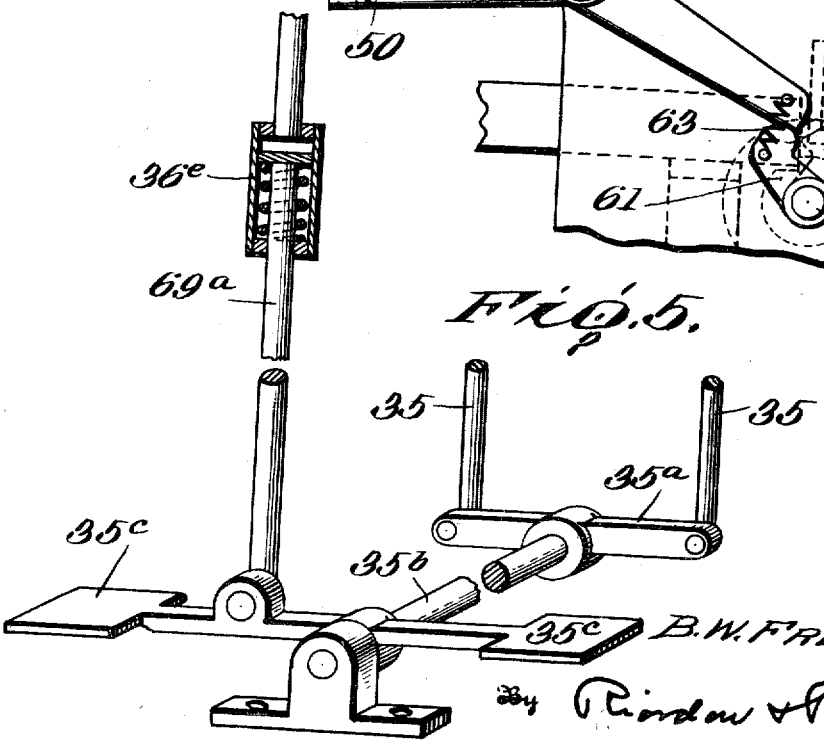
Fig. 5 is a diagrammatic showing of one form of operating mechanism for the machine.

In Fig. 5 I have shown a simple type of interconnecting linkage, which will cause proper synchronism of the reciprocating slide and plunger. I have shown the rods 35 connected to a rocker arm 35*a*, which is fixedly mounted on a shaft 35*b*. The double acting treadle 35*c* is also mounted fixedly on the shaft 35*b* so that the operator may press down on one end of the treadle to cause the work slide to move into operating position, and on the other to cause it to recede to work placing position.

By connecting the treadle rod 69*a*, which in the patent referred to is numbered 46, with a spring connection 36*e*, when the treadle to the left, as illustrated in Fig. 5 is depressed the slide is advanced by the rack and gear mechanism to operating position. As the slide reaches operating position the stop plate will cause the release of the safety latch, and the treadle arm being under tension will cause the plunger clutch to engage thereby depressing the plunger for one stroke. At the same time that one of the rods 35 causes the work slide to move the depressing of the foot treadle to the left pulls down on the rod 69*a*, causing the spring connection 36*e* to be tensioned.

By reference to Patent No. 1,681,033, and particularly to the descriptive matter on page 4, line 126 through page 6, line 88, and the detailed drawing of Fig. 7 of that patent, or by reference to the description of the safety device above, it will be noted that the tensioning of the spring connection 36*e* of the rod 69*a* will not cause any movement of the lever referred to in the patent as the member 45 or described above as member 55. As soon as the slide reaches operating position the clutch safety releasing mechanism is actuated and then the already tensioned rod 69*a* causes a single operation of the presser member.

While I have described my invention in connection with a cutout press applicable for cutting out patterns from a shoe upper, it is to be understood that my invention is not to be thus limited, but is applicable for use in any situation where it is desired to move work or tool holding block into and out of position in a press or other machine tool. I am not, therefore, to be limited to the exact details of construction shown nor the manner in which the invention is to be employed other than as pointed out in the appended claims.

Having thus described my invention, what I claim as new and desire to secure by Letters Patent of the United States, is:—

1. In a power drive for work holders and the like, the combination of a work support, a rack bar secured to one end thereof, a pinion meshing with said rack bar, a rotatably mounted shaft on which said pinion is mounted, a pair of pulleys rotatably mounted on said shaft, means for driving said pulleys in opposite directions, a clutch member adapted to be moved into engagement with either pulley for rotating said shaft in either direction to cause a reciprocating movement of the rack bar and work support, and means for moving said clutch at will.

2. In a power drive for work holders and the like, the combination of a work support, a rack bar attached to said work support, a pinion associated with said rack bar, a shaft on which said pinion is mounted, a pair of pulleys rotatably mounted on said shaft and spaced apart from each other, means for driving such pulleys in opposite directions, a clutch member rotatably and slidably mounted on said shaft, means for moving said clutch into engagement with either of the pulleys, and means for maintaining the clutch member in neutral position with respect to said pulleys under normal conditions.

3. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, one of said members being movable with said work supporting means, power actuated means for moving said support to a position of rest where the work may be adjusted on said support so as to be properly aligned with one of said component members, said power actuated means being further adapted to move said support to a different position of rest where said cutting means are actuated, and means independent of said power means for initiating actuation of said cutting means.

4. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, one of said members being movable with said work supporting means, power actuated means for moving said support to a position where the work may be adjusted on said support so as to be properly aligned with one of said component members, said power actuated means being further adapted to move said support to a different position where said cutting means are actuated, and means independent of said power means for initiating actuation of said cutting means.

5. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, one of said members being movable with said work supporting means, a power actuated means associated with said support for moving the same to a position of rest, where work may be adjusted, on said support in proper alignment with one of said component members and to a position where said cutting means are actuated, and means independent of said power means for initiating actuation of said cutting means.

6. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, including a plunger associated with the work support, one of said members being movable with said work supporting means, a power actuated means associated with said support for moving the same to a position of rest, where work may be adjusted on said support in proper alignment with one of said component members and to a position where said cutting means are actuated, and means independent of said power means for initiating actuation of said cutting means.

7. A cutout machine for operating upon fitted boot and shoe uppers, having cutting means and movable work supporting means shaped to support a portion of an upper to be cut, said machine having clearance spaces adjacent said supporting means, whereby other portions of said upper may be draped about said supporting means, and to protect a portion of said upper not to be cut, power actuated means for moving said support to a position of rest where the work may be adjusted on said support so as to be properly aligned with said cutting means, said power actuated means being further adapted to move said support to a different position of rest where said cutting means are actuated, and means independent of said power means for initiating actuation of said cutting means.

8. In a cutout machine for shoe uppers having a work support provided with ornamenting instrumentalities, power actuated means for moving said support to a position of rest where the work may be positioned on said support so as to be properly aligned with said ornamenting instrumentalities, and a clutch for connecting said means to said support, a second clutch adapted to connect said power actuating means to said support whereby to move said support to a different position of rest where said ornamenting instrumentalities are actuated.

9. In a cutout machine for shoe uppers having a work support provided with ornamenting instrumentalities, power actuated means for moving said support to a position where the work may be positioned on said support so as to be properly aligned with said ornamenting instrumentalities, and a clutch for connecting said means to said support, a second clutch adapted to connect said power actuated means to said support whereby to move said support to a different position where said ornamenting instrumentalities are actuated.

10. In a cutout machine for shoe uppers, the combination of a work support, ornamenting instrumentalities carried thereby, a power actuated means associated with a support for moving said support to a position of rest, where work may be positioned on said support in proper alignment with said ornamenting instrumentalities and to a position where said ornamenting instrumentalities are actuated, means to clutch said power actuated means to said support for moving the same to the work aligning position, and means to clutch said power actuated means to said support for moving the same to the ornamenting position.

11. In a cutout machine for shoe uppers, the combination of a work support, ornamenting instrumentalities carried thereby, a plunger associated with the work support, a power actuated means associated with a support for moving said support to a position of rest where work may be positioned on said support in proper alignment with said ornamenting instrumentalities, a clutch for connecting said means to said support thereby to move the support to the work aligning position, and a second clutch adapted to connect said power means to said support for moving the support to a position where said ornamenting instrumentalities are actuated.

12. In a cutout machine for shoe uppers, the combination of a work support, ornamenting instrumentalities carried thereby, a plunger associated with the work support, a power actuated means associated with the support for moving said support to a position of rest where work may be positioned on said support in proper alignment with said ornamenting instrumentalities, a clutch for connecting said means to said support thereby to move the support to the work aligning position, and a second clutch adapted to connect said power means to said support for moving the support to a position where said ornamenting instrumentalities are actuated, and means for operating the plunger and the support in synchronism.

13. In a machine for operating upon fitted boot and shoe uppers, the combination of a reciprocating plunger, a work support shaped to support an upper to be cut, and movable into and out of position with respect to the plunger, said machine having clearance spaces adjacent said support, whereby portions of said upper may be draped about the support, ornamenting instrumentalities carried by said work support for co-action with said plunger in ornamenting the work, and means for operating the plunger and the work support in synchronism.

14. In a machine for operating upon fitted boot and shoe uppers, the combination of a reciprocating plunger, a work support shaped to support an upper to be cut, and movable into and out of the path of movement of the plunger, said machine having clearance spaces adjacent said support, whereby portions of said upper may be draped about the support, ornamenting instrumentalities carried by said work support and adapted to co-act with the plunger in ornamenting the work, connections between the plunger and the work support, and means for operating the connections to cause a movement of the work support in synchronism with the reciprocating movement of the plunger.

15. In a device of the character described, the combination of a reciprocating plunger, a work holder movable into and out of the path of movement of the plunger, a power actuated means for operating the plunger, and for moving the work support, means to clutch said plunger to said power means, means to clutch said work holder to said power means, connections between the plunger and the work holder, and means for operating the connections to cause a movement of the work holder in synchronism with the reciprocating movement of the plunger.

16. In a power drive for work holders, and the like, the combination of a rotatably mounted shaft, means associated therewith for rotating said shaft in either direction at will, a pinion secured to said shaft, a rack bar engaging with said pinion, and a work holder connected to said rack bar, and means to clutch said shaft rotating means to the shaft for rotating same in one direction thereby to move said rack bar and said work holder, and means to clutch said shaft rotating means to said shaft, to rotate the same in the opposite direction thereby to move said rack bar and said work holder in an opposite direction.

17. A cutout machine for operating on fitted boot and shoe uppers having work supporting means shaped to support a portion of an upper to be cut, said machine having clearance spaces adjacent said supporting means, whereby other portions of said upper may be draped about said supporting means, and cutting means comprising component members, a treadle by means of which one of said component members may be moved to a location where the work may be adjusted on said support so as to be properly aligned with one of said component members, said treadle being further adapted to move one of said component members to a different position where said cutting means may be actuated, means to actuate said cutting means and a treadle for initiating said actuation.

18. A cutout machine having work supporting means constructed to support a portion of the work to be cut, said machine having clearance spaces adjacent said supporting means, whereby other portions of said work may be draped about said supporting means, and cutting means comprising component members, a treadle by means of which one of said component members may be moved to a location where the work may be adjusted on said support so as to be properly aligned with said component member, means to actuate said cutting means, and a treadle for initiating said actuation, and means to lock one of said treadles against movement until said member has reached a predetermined position.

19. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, one of said members being movable with said work supporting means, power actuated means for moving said support to a position where the work may be adjusted on said support so as to be properly aligned with one of said component members, said power actuated means being further adapted to move said support to a different position where said cutting means are actuated, and means to lock one of said component members against movement until the other of said component members has been aligned therewith.

20. A cutout machine for operating upon fitted boot and shoe uppers and having work supporting means shaped to support a portion of an upper to be cut, said machine having clearance spaces adjacent said supporting means, whereby other portions of said upper may be draped about said supporting means, and cutting means comprising component members, one of said members being movable to a location where the work may be properly adjusted on said support, treadle controlled means to actuate said movable component member, power actuated means to move one of said component members to complete the operation upon the upper, and means to lock said power actuated means until the work is properly aligned on the support.

21. A cutout machine having work supporting means constructed to support a portion of the work to be cut, said machine having clearance spaces adjacent said supporting means, whereby other portions of said work may be draped about said supporting means, and cutting means comprising component members, a treadle by means of which one of said component members may be moved to a location where the work may be adjusted on said support so as to be properly aligned with said component member, means to actuate said cutting means, and a treadle for initiating said actuation, and means to lock said cutter actuating means against movement until said component member has reached a predetermined position.

22. A cutout machine for operating upon fitted boot and shoe uppers, having work supporting means shaped to support a portion of an upper to be cut, said machine having clearance spaces adjacent said supporting means, whereby other portions of said upper may be draped about said supporting means, and cutting means comprising component members, a treadle by means of which one of said component members may be moved to a location where the work may be adjusted on said support so as to be properly aligned with said component member, said treadle being further adapted to move said component member to a different position where said cutting means may be actuated, means to actuate said cutting means and a treadle for initiating said actuation, and means to lock said cutter actuating means against movement until said component member has reached a predetermined position.

23. In a device of the character described, the combination of a reciprocating plunger and a work support, said support being shaped to support flatwise a portion of a shoe upper with other portions of the upper draped about lateral sides of the support, said machine having clearance spaces adjacent said support to accommodate said laterally draped portions, an ornamenting die mounted in said machine for coaction with said plunger and work support and movable in said machine to a position where the work may be properly located with respect to said die, and a treadle for initiating movement of said die, and a second treadle for moving said plunger to accomplish the ornamenting of the work, and means to lock said second treadle against movement until said die has reached a predetermined position.

24. A cutout machine of the class described, having in combination a movable member, means to move said member to a position where the work may be properly adjusted in the machine, and a member movable after adjustment of the work to complete an ornamenting operation on the work, means to initiate actuation of said first member, means independent of, and separately controllable, with respect to said first means, to initiate actuation of said second member, and means to prevent movement of said second member until completion of the mentioned movement of the first member.

25. In a cutout machine of the class described, the combination of treadle controlled ornamenting instrumentalities with treadle controlled means effective to move one of said instrumentalities to a position where the work may be adjusted relative to said instrumentality, and means to lock another of said ornamenting instrumentalities against movement relative to the work until said first means have reached a predetermined position.

26. In a cutout machine for operating upon fitted boot and shoe uppers, the combination of work supporting means, and ornamenting instrumentalities operative through a cycle of operations to ornament the work, with means to move said ornamenting instrumentalities through a portion of the cycle, thereby to permit aligning of the work with said instrumentalities, and means independent of, and separately controllable, from said first means, effective to move said ornamenting instrumentalities through the remainder of said cycle whereby the work is ornamented.

27. In a cutout machine for operating upon fitted boot and shoe uppers, the combination of work supporting means, and ornamenting instrumentalities operative through a cycle of operations to ornament the work, with means to move said ornamenting instrumentalities through a portion of the cycle, thereby to permit aligning of the work with said instrumentalities, and power actuated means independent of, and separately controllable, from said first means, effective to move said ornamenting instrumentalities through the remainder of said cycle whereby the work is ornamented.

28. In a cutout machine for operating upon fitted boot and shoe uppers, the combination of work supporting means shaped to support a portion of the work to be cut, said machine having clearance spaces adjacent said supporting means, whereby other portions of the work may be draped about the supporting means, and ornamenting instrumentalities operative through a cycle of operations to ornament the work, with treadle controlled means to move said ornamenting instrumentalities through a portion of the cycle, thereby to permit aligning of the work with said instrumentalities, and treadle controlled and power actuated means to move said ornamenting instrumentalities through the remainder of said cycle whereby the work is ornamented.

29. In a cutout machine for operating upon fitted boot and shoe uppers, the combination of work supporting means shaped to support a portion of the work to be cut, said machine having clearance spaces adjacent said supporting means, whereby other portions of the work may be draped about the supporting means, and ornamenting instrumentalities operative through a cycle of operations to ornament the work, with treadle controlled means to move said ornamenting instrumentalities through a portion of the cycle, thereby to permit aligning of the work with said instrumentalities, and treadle controlled means to move said ornamenting instrumentalities through the remainder of said cycle whereby the work is ornamented.

30. A cut out machine for operating on fitted boot and shoe uppers having work supporting means shaped to support a portion of an upper to be cut, said machine having clearance spaces adjacent said supporting means, whereby other portions of said upper may be draped about said supporting means, and cutting means comprising component members, means to move one of said component members to a location where the work may be adjusted on said support so as to be properly aligned with one of said component members, said means being further adapted to move one of said component members to a different position where said cutting means may be actuated, means to actuate said cutting means, and means independent of said member moving means to initiate said actuation.

31. A cutout machine for operating on fitted boot and shoe uppers having work supporting means shaped to support a portion of the work to be cut, said machine having clearance spaces adjacent said supporting means, whereby other portions of said upper may be draped about said supporting means, and cutting means comprising component members, means to move one of said component members to a location where the work may be adjusted on said support so as to be properly aligned with said component member, means to actuate said cutting means, and means independent of, and separately controllable, from said member moving means, to initiate said actuation after said member has reached a predetermined position.

32. A cutout machine for operating on fitted boot and shoe uppers having work supporting means adjusted to support a portion of an upper to be cut, said machine having clearance spaces adjacent said supporting means, whereby other portions of said upper may be draped about said supporting means, and cutting means comprising component members, one of said members being movable with said work supporting means, power actuated means for moving said support to a position where the work may be adjusted on said support for proper alignment with one of said component members, said power actuated means being further adapted to move said support to a different position where said cutting means are actuated, and means to move one of said component members after the other of said component members has been aligned therewith.

33. A cutout machine for operating upon fitted boot and shoe uppers and having work supporting means shaped to support a portion of an upper to be cut, said machine having clearance spaces adjacent said supporting means, whereby other portions of said upper may be draped about said supporting means, and cutting means comprising component members, one of said members being movable to a location where the work may be properly adjusted on the support, means to actuate said component member, power actuated means to move one of said component members to complete the operation upon the upper, and means independent of, and separately controllable, from said power means to initiate action of said power actuated means after said first mentioned member reaches a predetermined position.

34. A cutout machine for operating upon fitted boot and shoe uppers having work supporting means shaped to support a portion of the work to be cut, said machine having clearance spaces adjacent said supporting means, whereby other portions of said upper may be draped about said supporting means, and cutting means comprising component members, means to move one of said component members to a location where the work may be adjusted on said support so as to properly align with said component member, means to actuate another of the component members after said first named component member has reached a predetermined position, thereby to ornament the work, and means independent of, and separately controllable, from said member moving means to initiate said actuation.

35. A cutout machine for operating upon fitted boot and shoe uppers having work supporting means shaped to support a portion of an upper to be cut, said machine having clearance spaces adjacent said supporting means, whereby other portions of said upper may be draped about said supporting means, and cutting means comprising component members, means to move one of said component members to a location where the work may be adjusted on said support in proper alignment with said component member, said moving means being further adapted to move said component member to a different position where said cutting means may be actuated, means to actuate said cutting means, means for initiating said actuation, and means to prevent said actuation until after said component member has reached a predetermined position.

36. In a device of the character described, the combination of a reciprocating plunger, and a work support shaped to support a portion of the work to be cut, said machine having clearance spaces adjacent said support, whereby portions of the work may be draped about the support, a die mounted in said machine for coaction with said plunger and work support, and movable in said machine to a position where the work may be properly located with respect to said die, means for initiating movement of said die, means for moving said plunger to accomplish the ornamenting of the work, and means to operate said last named means after the die has reached a predetermined position.

37. A cutout machine of the class described having in combination a member movable to a position where proper adjustment of the work in the machine may be effected and a member movable after adjustment of the work to complete an ornamenting operation on the work, means to initiate actuation of said first member, and means independent of, and separately controllable, with respect to said first means to initiate actuation of said second member after completion of the mentioned movement of the first member.

38. In a cutout machine of the class described, the combination of treadle controlled ornamenting instrumentalities with control means effective to move one of said instrumentalities to a position where the work may be adjusted relative to said instrumentality, and means independent of said control means to move another of said ornamenting instrumentalities relative to the work after said moving means have completed their mentioned movement.

In testimony whereof, I hereunto set my signature.

BENJAMIN W. FREEMAN.

CERTIFICATE OF CORRECTION.

Reissue Patent No. 18,162. Granted August 25, 1931, to

BENJAMIN W. FREEMAN.

It is hereby certified that error appears in the printed specification of the above numbered patent requiring correction as follows: Page 8, line 96, claim 32, for the word "adjusted" read shaped; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.